(12) United States Patent
Herlihy et al.

(10) Patent No.: US 7,971,499 B2
(45) Date of Patent: Jul. 5, 2011

(54) ADJUSTABLE GEAR POSITION ARRANGEMENT FOR SYNCHRONIZATION OF MULTIPLE GENERATORS

(75) Inventors: Christopher J. Herlihy, Scottsdale, AZ (US); Ronald P. Maty, Chandler, AZ (US); Edward M. Brady, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 888 days.

(21) Appl. No.: 11/938,601

(22) Filed: Nov. 12, 2007

(65) Prior Publication Data
US 2008/0060476 A1    Mar. 13, 2008

Related U.S. Application Data

(63) Continuation-in-part of application No. 10/994,900, filed on Nov. 22, 2004, now abandoned.

(51) Int. Cl.
*F16H 57/12* (2006.01)
(52) U.S. Cl. .......................................... 74/392
(58) Field of Classification Search .................. 29/893, 29/893.1, 893.2, 407.1, 407.05, 407.09
See application file for complete search history.

(56) References Cited

U.S. PATENT DOCUMENTS

| | | | |
|---|---|---|---|
| 1,057,928 A | | 4/1913 | Briggs |
| 1,233,954 A | | 7/1917 | Alquist |
| 2,952,973 A | | 9/1960 | Hall et al. |
| 3,605,516 A | * | 9/1971 | Hausinger ...................... 74/401 |
| 3,853,432 A | | 12/1974 | Cronstedt |
| 3,915,026 A | * | 10/1975 | Otto ................................ 74/401 |
| 3,939,723 A | | 2/1976 | Helm |
| 4,086,759 A | | 5/1978 | Karstensen et al. |
| 4,207,815 A | | 6/1980 | Watanabe |
| 4,407,598 A | | 10/1983 | Hendershot |
| 4,546,865 A | | 10/1985 | Hodgman et al. |
| 4,566,664 A | | 1/1986 | Donald |
| 4,640,153 A | | 2/1987 | Brogdon et al. |
| 5,232,250 A | | 8/1993 | Bonacci |
| 5,511,874 A | * | 4/1996 | Ikegami et al. ............... 366/100 |
| 5,533,825 A | | 7/1996 | Stone |
| 5,588,328 A | * | 12/1996 | Nihei et al. ..................... 74/409 |
| 5,782,451 A | | 7/1998 | Carnahan et al. |
| 5,836,076 A | | 11/1998 | Duta et al. |

(Continued)

OTHER PUBLICATIONS

Maty, Ronald P. et al. "Adjustable Flange Arrangement for Synchronization of Multiple Generators," U.S. Appl. No. 11/181,183, filed Jul. 13, 2005.

(Continued)

*Primary Examiner* — Justin Holmes
(74) *Attorney, Agent, or Firm* — Ingrassia Fisher & Lorenz, P.C.

(57) ABSTRACT

A method for synchronizing multiple generators includes positioning a pilot feature of a shaft of a first generator positioned at a first angular position that is substantially aligned with a first predetermined reference point located at a predetermined angular position relative to an axis, locking the shaft of the first generator at the first angular position, aligning a pilot feature of a first shaft of a second generator with a second angular position that is substantially aligned with a second predetermined reference point located at a position relative to the axis that is substantially equal to the predetermined angular position, calculating an angular difference between the two angular positions, and rotating a second shaft splined with the first shaft of the second generator about the axis in another direction, based on the calculated angular difference.

19 Claims, 11 Drawing Sheets

U.S. PATENT DOCUMENTS

| | | | |
|---|---|---|---|
| 5,914,550 A | 6/1999 | Periyathamby et al. | |
| 6,093,009 A * | 7/2000 | Jacks, Jr. | 418/201.1 |
| 6,158,210 A | 12/2000 | Orlando | |
| 6,169,334 B1 | 1/2001 | Edelman | |
| 6,239,524 B1 | 5/2001 | Leibowtiz | |
| 6,304,002 B1 | 10/2001 | Dehlsen et al. | |
| 6,428,417 B2 | 8/2002 | Wakizaka et al. | |
| 6,520,886 B2 | 2/2003 | Schwertberger | |
| 6,676,379 B2 | 1/2004 | Eccles et al. | |
| 6,731,017 B2 | 5/2004 | Mikhall et al. | |
| 7,144,349 B2 | 12/2006 | Mitrovic | |
| 7,251,942 B2 * | 8/2007 | Dittmar et al. | 60/788 |
| 2004/0025496 A1 | 2/2004 | Patterson, Jr. | |
| 2004/0212273 A1 | 10/2004 | Gould | |
| 2005/0284150 A1 | 12/2005 | Dittmar et al. | |
| 2006/0107787 A1 | 5/2006 | Herlihy et al. | |

OTHER PUBLICATIONS

United States Patent and Trademark Office Non-Final Office Action, mailed Oct. 24, 2008, for U.S. Appl. No. 11/181,183, filed Jul. 13, 2005.

* cited by examiner

ADJUSTABLE GEAR POSITION ARRANGEMENT FOR SYNCHRONIZATION OF MULTIPLE GENERATORS

CROSS-REFERENCES TO RELATED APPLICATIONS

This is a continuation-in-part of application Ser. No. 10/994,900, filed Nov. 22, 2004.

BACKGROUND

This inventive subject matter generally relates to gear arrangements for synchronization of multiple generators and more specifically to adjustable gear arrangements having a two-splined shaft and a helical gear for coarse and fine adjustments for synchronizing the drive shafts of multiple generators.

Engines having multiple, gearbox-mounted generators often require the generator drive gears in the gearbox to be phased to the generator rotor position for efficient delivery of generated power. The multiple generators are driven through a series of gears that allow increasing engine output speed to the necessary generator input speed. Each individual generator stator has to be in precisely the same position relative to its rotor as all the other generators. This requires all the gears in the drive train to be synchronized as well since they are connected to the generators.

Most of the gear arrangements and methods of synchronization of multiple drive shafts of the prior art require synchronization of the drive shafts during actual operation of the engine. This can be time consuming and difficult, especially when more than two rotating shafts are involved. For example, U.S. Pat. Nos. 3,939,723 and 4,207,815 describe a gear arrangement utilizing the relative axial position of helical gears to adjust relative circumferential position of two rotating shafts during operation of a motor. Neither gear arrangement from either patent allows for synchronization of the rotating shafts prior to engine operation, nor do they allow for synchronization of more than two rotating shafts.

As can be seen, there is a need for a gear arrangement that allows for synchronization of rotating drive shafts prior to engine operation, particularly during manufacture of the engine. There is also a need for a gear arrangement that allows for the synchronization of multiple drive shafts, particularly greater than two drive shafts, without requiring precision manufacturing of gear teeth elements relative to generator driveshaft splines.

SUMMARY

In an embodiment, by way of example only, there is provided an adjustable gear arrangement comprising a two-piece splined shaft, the two-piece splined shaft comprising an intermediate shaft comprising an internal spline; a drive gear shaft comprising a generator drive gear; a fine pitch spline comprising external spline teeth on the intermediate shaft and internal spline teeth on the drive gear shaft, the fine pitch spline connecting the intermediate shaft and the drive gear shaft; and a generator drive shaft, the generator drive shaft connected to the intermediate shaft through the internal spline.

In another embodiment, by way of example only, there is provided an adjustable gear arrangement comprising a two-piece splined shaft comprising an intermediate shaft comprising an internal spline; a drive gear shaft comprising a generator drive gear; a fine pitch spline comprising external spline teeth on the intermediate shaft and internal spline teeth on the drive gear shaft, the fine pitch spline connecting the intermediate shaft and the drive gear shaft; a generator drive shaft, the generator drive shaft connected to the intermediate shaft through the internal spline; an idler gear, the idler gear engaging the generator drive gear; an input gear, the input gear engaging the idler gear; and an engine quill shaft, the engine quill shaft driving the input gear.

In a further embodiment, by way of example only, there is provided an adjustable gear arrangement comprising a two-piece splined shaft, the two-piece splined shaft comprising an intermediate shaft comprising an internal spline; a drive gear shaft comprising a generator drive gear, wherein the generator gear drive comprises drive gear teeth; a fine pitch spline comprising external spline teeth on the intermediate shaft and internal spline teeth on the drive gear shaft, the fine pitch spline connecting the intermediate shaft and the drive gear shaft, wherein the fine pitch spline has from about 1 to about 20 more external spline teeth and from about 1 to about 20 more internal spline teeth than the generator drive gear has drive gear teeth; a generator drive shaft, the generator drive shaft connected to the intermediate shaft through the internal spline; an idler gear, the idler gear engaging the generator drive gear, wherein the idler gear comprises idler gear teeth and wherein the number of drive gear teeth of the generator drive gear is divisible by a first prime number and the number of idler gear teeth of the idler gear are divisible by a second prime number; an input gear, the input gear engaging the idler gear; and an engine quill shaft, the engine quill shaft driving the input gear.

In yet another embodiment, by way of example only, there is provided a gearbox comprising an adjustable gear arrangement, the adjustable gear arrangement comprising a two-piece splined shaft, the two-piece splined shaft comprising an intermediate shaft comprising an internal spline; a drive gear shaft comprising a generator drive gear; a fine pitch spline comprising external spline teeth on the intermediate shaft and internal spline teeth on the drive gear shaft, the fine pitch spline connecting the intermediate shaft and the drive gear shaft; a generator drive shaft, the generator drive shaft connected to the intermediate shaft through the internal spline; an idler gear, the idler gear engaging the generator drive gear; an input gear, the input gear engaging the idler gear; and an engine quill shaft, the engine quill shaft driving the input gear.

In another embodiment, by way of example only, there is provided a gas turbine engine, wherein the gas turbine engine is coupled to a gearbox, the gearbox comprising at least two adjustable gear arrangements, the gear arrangements each comprising a two-piece splined shaft, the two-piece splined shaft comprising an intermediate shaft comprising an internal spline; a drive gear shaft comprising a generator drive gear; a fine pitch spline comprising external spline teeth on the intermediate shaft and internal spline teeth on the drive gear shaft, the fine pitch spline connecting the intermediate shaft and the drive gear shaft; and a generator drive shaft, the generator drive shaft connected to the intermediate shaft through the internal spline; an idler gear, the idler gear engaging the generator drive gear, an input gear, the input gear engaging the idler gear, and an engine quill shaft, the engine quill shaft driving the input gear; and at least two gearbox-mounted generators, wherein the gearbox-mounted generators are connected to the gearbox through the generator drive shaft.

In yet another embodiment, by way of example only, there is provided a method for synchronization of multiple generators in a gas turbine engine comprising the steps of locking an input gear and an idler gear, wherein the input gear engages the idler gear; rotating a drive gear shaft, the drive gear shaft comprising a helical generator drive gear and a fine pitch spline, wherein the generator drive gear is engaged by the idler gear; positioning the drive gear shaft to a desired degree of alignment with an intermediate shaft, wherein the intermediate shaft is connected to the drive gear shaft through the fine pitch spline; advancing the helical generator drive gear axially by varying a thickness of a shim to fine tune the degree of alignment; clamping the generator drive gear in position; and repeating all of the above steps above for each generator to be synchronized.

These and other features, aspects and advantages of the inventive subject matter will become better understood with reference to the following drawings, description and claims.

DETAILED DESCRIPTION

The following detailed description is not to be taken in a limiting sense, but is made merely for the purpose of illustrating the general principles of the inventive subject matter, since the scope of the inventive subject matter is best defined by the appended claims.

Broadly, an adjustable gear arrangement is provided by the inventive subject matter for the synchronization of multiple generators driven by a gas turbine engine. Some gas turbine engines may have multiple generators which may be mounted on a single gearbox. For efficient power generation, it may be desirable to synchronize the generators such that they are driven in a precise parallel manner. The adjustable gear arrangement of the inventive subject matter may allow for the precise synchronization of the generators so that they may be driven in a precisely parallel manner. The adjustable gear arrangement may be used, for example, in combination with any gas turbine engine having multiple gearbox-mounted generators, such as the engines used in gas turbine-driven land vehicles.

Currently in the prior art, the synchronization of multiple generators in gas turbine engines and other applications may be accomplished by adjusting the relative axial position of a helical gear. This adjustment may have to be done after the engine is assembled and while the engine is running, which may be awkward and time consuming. Additionally, precise synchronization may require precision manufacturing of the helical gears and other engine parts to properly position the generator drive spline teeth relative to the gear teeth. The greater the number of multiple generators, the more difficult it may be to precisely synchronize the generators. The adjustable gear arrangement of the inventive subject matter may eliminate these deficiencies as it may allow for two-step synchronization of multiple generators with a fine-tuning step after the initial synchronization. The inventive subject matter may provide precise synchronization for multiple generators with a greater number of multiple generators, i.e., greater than two generators using a two-piece splined shaft as well as the axial adjustment of a helical gear. The adjustment of a two-piece splined shaft in combination with the axial adjustment of a helical gear may allow for more precise synchronization than the axial adjustment of a helical gear alone. Furthermore, the inventive subject matter may allow for the precise synchronization of multiple generators at assembly without incorporating excessive precision manufacturing requirements.

Figure 1:
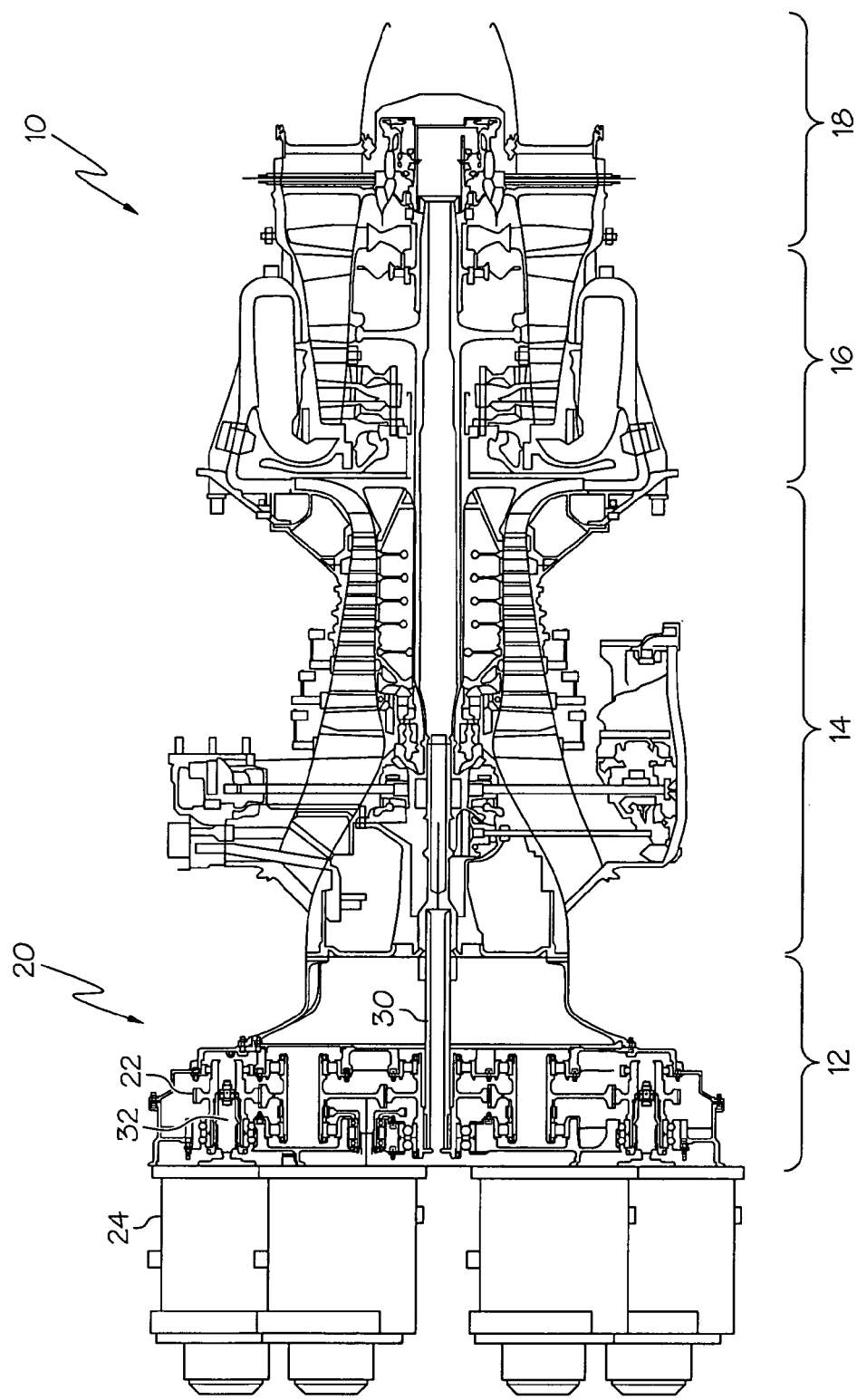
FIG. 1 is a cross-sectional view of a turbine engine, according to an embodiment.

According to an embodiment, FIG. 1 is a cross-section of a gas turbine engine 10 where the gas turbine engine 10 may be coupled to multiple generators 24. Gas turbine engine 10 may be coupled to at least two generators 24, wherein all of generators 24 may be mounted on a single gearbox 12. Although the gas turbine engine 10 illustrated in FIG. 1 shows four gearbox-mounted generators 24, it is contemplated that gas turbine engine 10 may have any number of gearbox-mounted generators 24. In an illustrative embodiment, gas turbine engine 10 may have six gearbox-mounted generators 24, although more or fewer also may be included. Gas turbine engine 10 may further comprise a gas generator 14, a combustor module 16, and a turbine module 18 which are connected to the generator 24 through an engine quill shaft 30 in gearbox 12. When gas turbine engine 10 is in operation, quill shaft 30 drives generator 24 through a set of gears (see, for example, FIG. 2).

Figure 2:
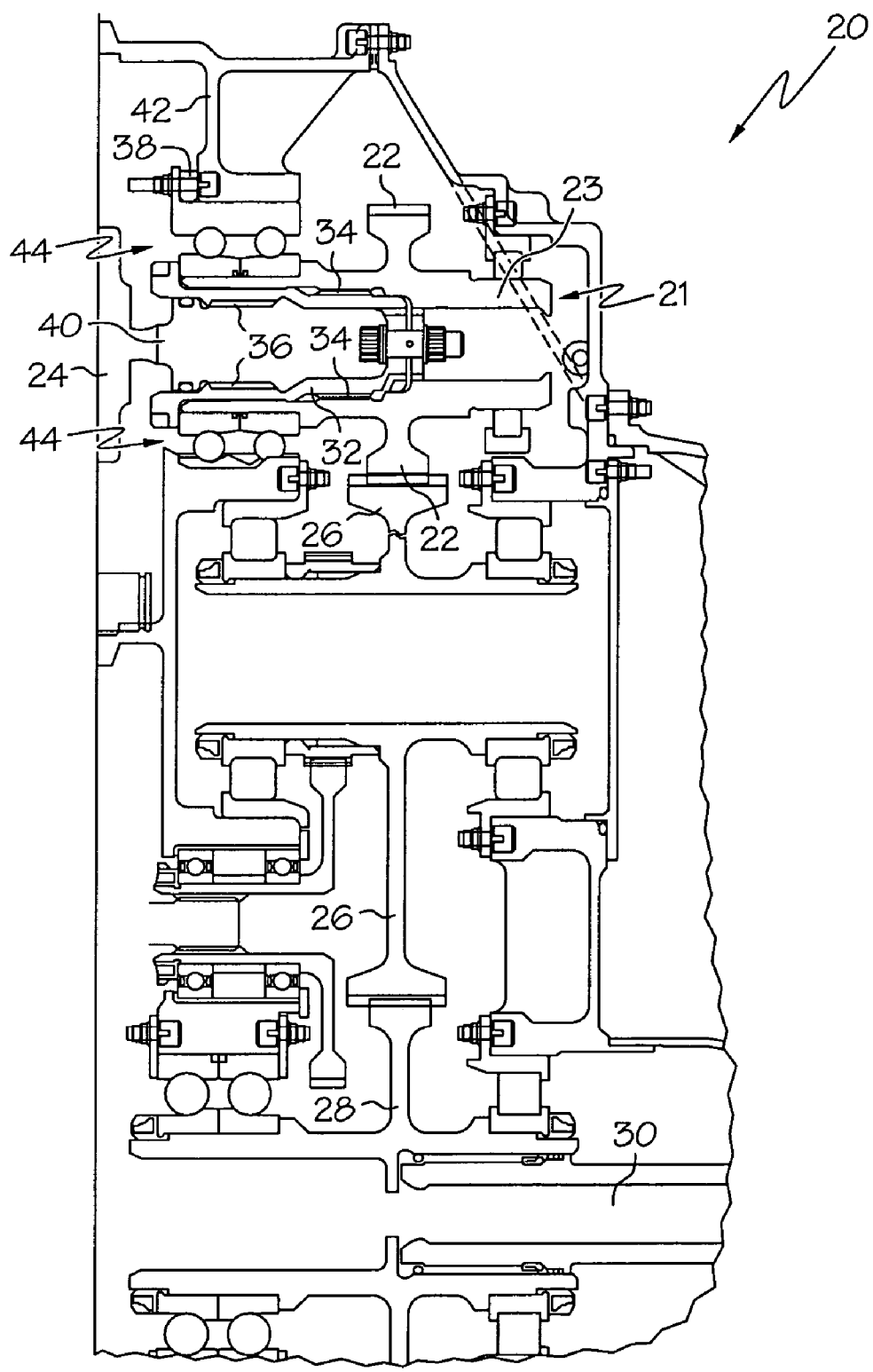
FIG. 2 is a partial cross-sectional view of a turbine engine gearbox showing an adjustable gear arrangement, according to an embodiment.
Figure 3:
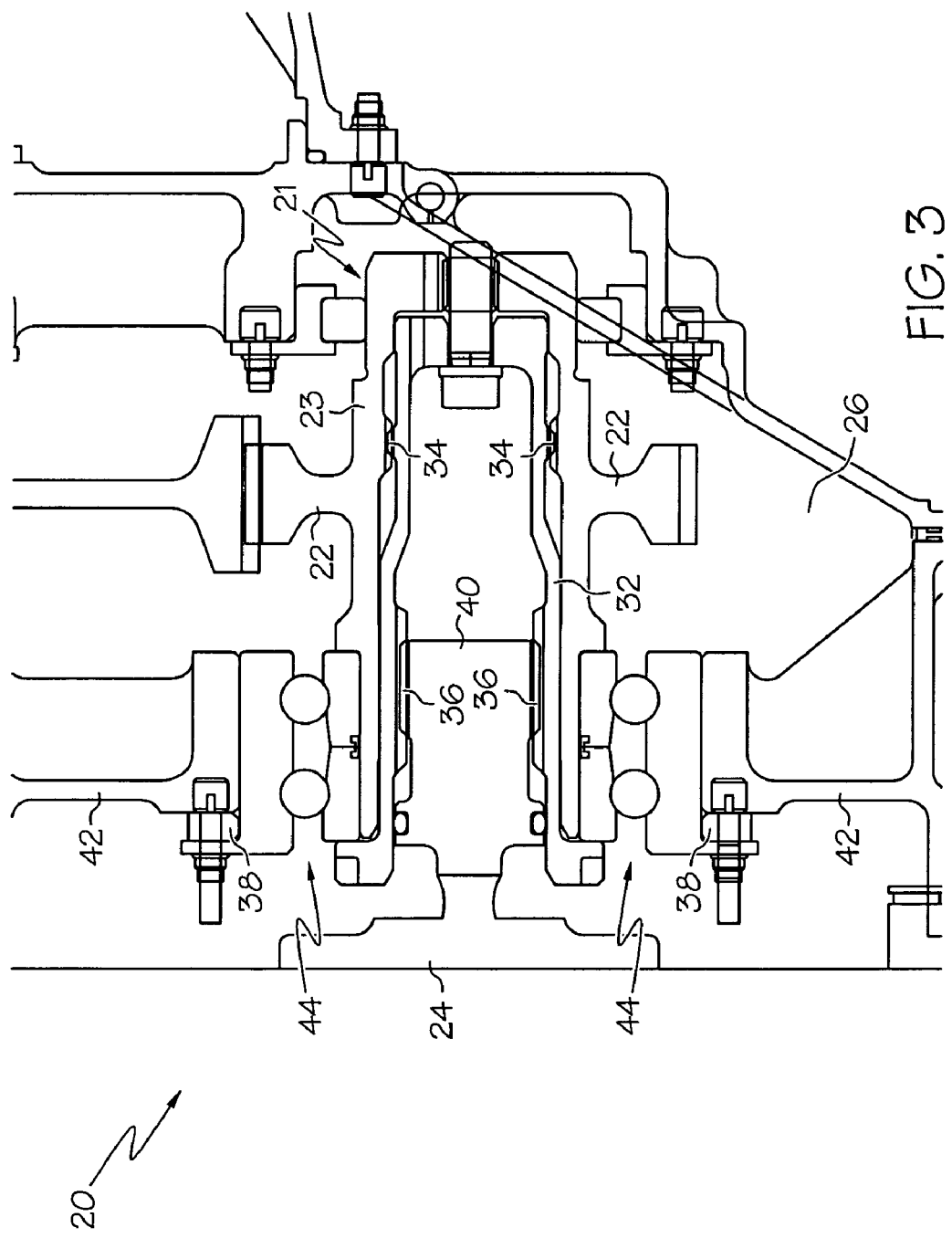
FIG. 3 is an expanded view of a portion of FIG. 2, according to an embodiment.
Figure 4:
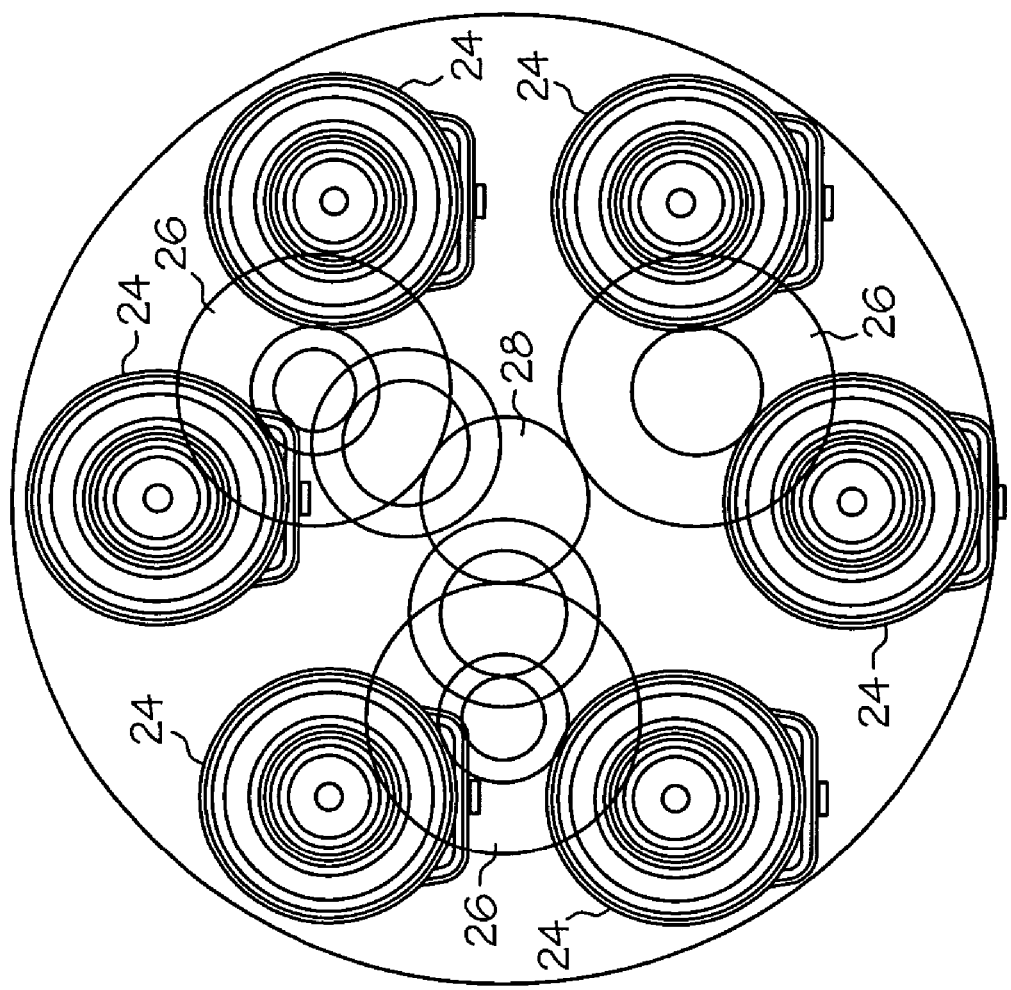
FIG. 4 is an end view of the adjustable gear arrangement of FIG. 2, according to an embodiment.

Referring also to FIGS. 2, 3 and 4, an adjustable gear arrangement 20 for synchronization of multiple generators 24 may comprise a two-piece splined shaft 21 for driving generators 24; two-piece splined shaft 21 may comprise a drive gear shaft 23 and an intermediate shaft 32. Drive gear shaft 23 and intermediate shaft 32 may be coupled through a fine pitch spline 34. Fine pitch spline 34 may comprise external spline teeth (not shown) on intermediate shaft 32 and internal spline teeth (not shown) on drive gear shaft 23, enabling drive gear shaft 23 and intermediate shaft 32 to rotate together. Drive gear shaft 23 may further comprise a generator drive gear 22 which connects engine quill shaft 30 to the two-piece splined shaft 21. Intermediate shaft 32 may further comprise internal spline 36 which may couple intermediate shaft 32 with the external spline (not shown) of a generator drive shaft 40, where generator drive shaft 40 may be connected to generator 24. The external spline of generator drive shaft 40 may incorporate a timing feature such as a missing tooth which may engage an extra tooth on the internal spline 36. Adjustable gear arrangement 20 may also comprise idler gear 26 and input gear 28, wherein input gear 28 may engage idler gear 26, and idler gear 26 may then engage generator drive gear 22. In one illustrative embodiment, generator drive gear 22, idler gear 26, and input gear 28 may be helical gears.

Two-piece splined shaft 21 may allow for greater precision in synchronization of multiple generators 24 compared to synchronization by alignment of generator drive gear 22 alone. Two-piece splined shaft 21 may comprise drive gear shaft 23, where drive gear shaft 23 may comprise fine pitch spline 34. Fine pitch spline 34 may comprise a large number of external spline teeth (not shown) on intermediate shaft 32 and a large number of internal spline teeth (not shown) on drive gear shaft 23, enabling drive gear shaft 23 and intermediate shaft 32 to rotate together. By way of non-limiting example, fine pitch spline 34 may have from about 50 to about 70 each external and internal spline teeth. However, more or fewer teeth may alternatively be included. As the total number of spline teeth increases, the synchronization of multiple generators 24 may become more precise. Fine pitch spline 34 may be adjusted with respect to intermediate shaft 32 in synchronizing multiple generators 24 and the greater the number of spline teeth, the more precise the adjustment. If a single, one-piece shaft was used instead of the two-piece splined shaft 21, then this level of precise adjustment may not be available. The number of spline teeth of fine pitch spline 34 may only be limited by the size of fine pitch spline 34, the size of which may be determined by the size of gas turbine engine 10.

Drive gear shaft 23 may further comprise generator drive gear 22. The degree of synchronization of multiple generators 24 achievable by the inventive subject matter may be a function of the number of drive gear teeth of generator drive gear 22 and the number of spline teeth of fine pitch spline 34. The greater the numbers of drive gear teeth on generator drive gear 22 or spline teeth of fine pitch spline 34, the smaller the increments that either generator drive gear 22 or fine pitch spline 34 may be moved to synchronize multiple generators 24. It will be appreciated that the smaller the increments of movement, the more precise the synchronization of generators 24 may be. In one illustrative embodiment, generator drive gear 22 and fine pitch spline 34 may each have from about 50 to about 75 drive gear teeth and external and internal spline teeth, respectively. However, more or fewer teeth may alternatively be included. As discussed above for fine pitch spline 34, the number of drive gear teeth on generator drive gear 22 may be limited by the size of generator drive gear 22. In one embodiment, fine pitch spline 34 may have more spline teeth than generator drive gear 22 has drive gear teeth. For example, fine pitch spline 34 may have from about 1 to about 20 more external spline teeth and from about 1 to about 20 more internal spline teeth than generator drive gear 22 has drive gear teeth. Alternatively, fine pitch spline 34 may have from about 2 to about 5 more external spline teeth and from about 2 to about 5 more internal spline teeth than generator drive gear 22 has drive gear teeth. In an illustrative embodiment, fine pitch spline 34 may have about 61 each external spline teeth and internal spline teeth, while generator drive gear 22 may have about 59 drive gear teeth. By way of non-limiting example where fine pitch spline 34 has 61 each external and internal spline teeth and generator drive gear 22 has 59 teeth, rotating drive gear shaft 23 with respect to intermediate shaft 32 by one spline tooth may result in an angle change of about 5.90°. Rotating drive gear shaft 23 may also cause generator drive gear 22 to rotate one by one drive gear tooth with respect to idler gear 26 which may result in a second angle change of about 6.10°. The difference between the two angle changes, about 0.2°, may be the angle change for internal spline 36 of intermediate shaft 32 with respect to generator drive shaft 40. This small change in the angle for internal spline 36 allows for precise synchronization of multiple generators 24.

The generator speed may be established by the combination of the number of drive gear teeth on the generator drive gear 22 and input gear teeth on the input gear 28. In one embodiment, the number of drive gear teeth of generator drive gear 22 is divisible by a first prime number and the number of idler gear teeth of idler gear 26 is divided by a second prime number, wherein the first prime number and the second prime number are different. In the most basic example, the number of drive gear teeth of generator drive gear 22 may equal a first prime number and the number of idler gear teeth of idler gear 26 may equal a second prime number, where the first prime number and the second prime number are different.

Adjustable gear arrangement 20 may further comprise a shim 38 located under gear mounting flange 42 and connecting to drive gear shaft 23 through a thrust bearing assembly 44. Varying the thickness of shim 38 may control the axial position of generator drive gear 22 (see, for example, FIG. 5, step 108). By way of non-limiting example, thrust bearing assembly 44 is shown in FIGS. 2 and 3 as a duplex bearing assembly. However, thrust bearing assembly 44 may be of any design, such as but not limited to, single-row, double-row or duplex design.

It is contemplated that adjustable gear arrangement of the inventive subject matter may be used in any application requiring the accurate synchronization of multiple shafts driven through a gear system, including, but not limited to the synchronization of multiple generators of a gas turbine engine.

Figure 5:
FIG. 5 is a flow chart for a method of synchronization of multiple generators, according to an embodiment.

FIG. 5 illustrates a method 100 for synchronization of multiple generators of a gas turbine engine using the adjustable gear arrangement of the inventive subject matter. Step 102 includes locking an input gear and an idler gear. The input gear may engage the idler gear and by locking both gears, they may not rotate during the adjustment of the remainder of gears in the adjustable gear arrangement. Step 104 includes rotating a drive gear shaft wherein the drive gear shaft may be rotated in either direction. The drive gear shaft may comprise a fine pitch spline and a generator drive gear which may rotate together when the drive shaft is rotated. Step 106 includes positioning the drive shaft in alignment to the intermediate shaft. The achievable alignment in step 106 may be a function of the products of the number of teeth of the generator drive gear, the idler gear, and the fine pitch spline. Step 108 includes advancing the generator drive gear axially. The axial positioning of the generator drive gear may be controlled by varying the thickness of a shim located under the gear mounting flange to thereby allow the generator drive gear to be adjusted relative to the drive shaft. Since the generator drive gear may be held against the locked idler gear while being axially advanced, drive gear teeth of the generator drive gear cause rotation of the generator drive gear relative to the locked idler and input gears in small increments. Adjusting the axial position of the gear drive shaft and consequently, the generator drive gear, is a 'fine tune' adjustment of the synchronization. Finally, Step 110 includes clamping the generator drive gear into position. Method 100 of synchronization of multiple generators may be repeated for all of the generators until the degree of alignment of all the generators are within the desired tolerance. In an illustrative embodiment, the degree of alignment for all the generators may differ by from about ±0.1° to about ±1.0° with respect to a rotor and stator of each generator. Although the foregoing method is described for synchronizing multiple generators in a gas turbine engine, it is contemplated that the method may be used in any application requiring the accurate synchronization of multiple shafts driven through a gear system.

Figure 6:
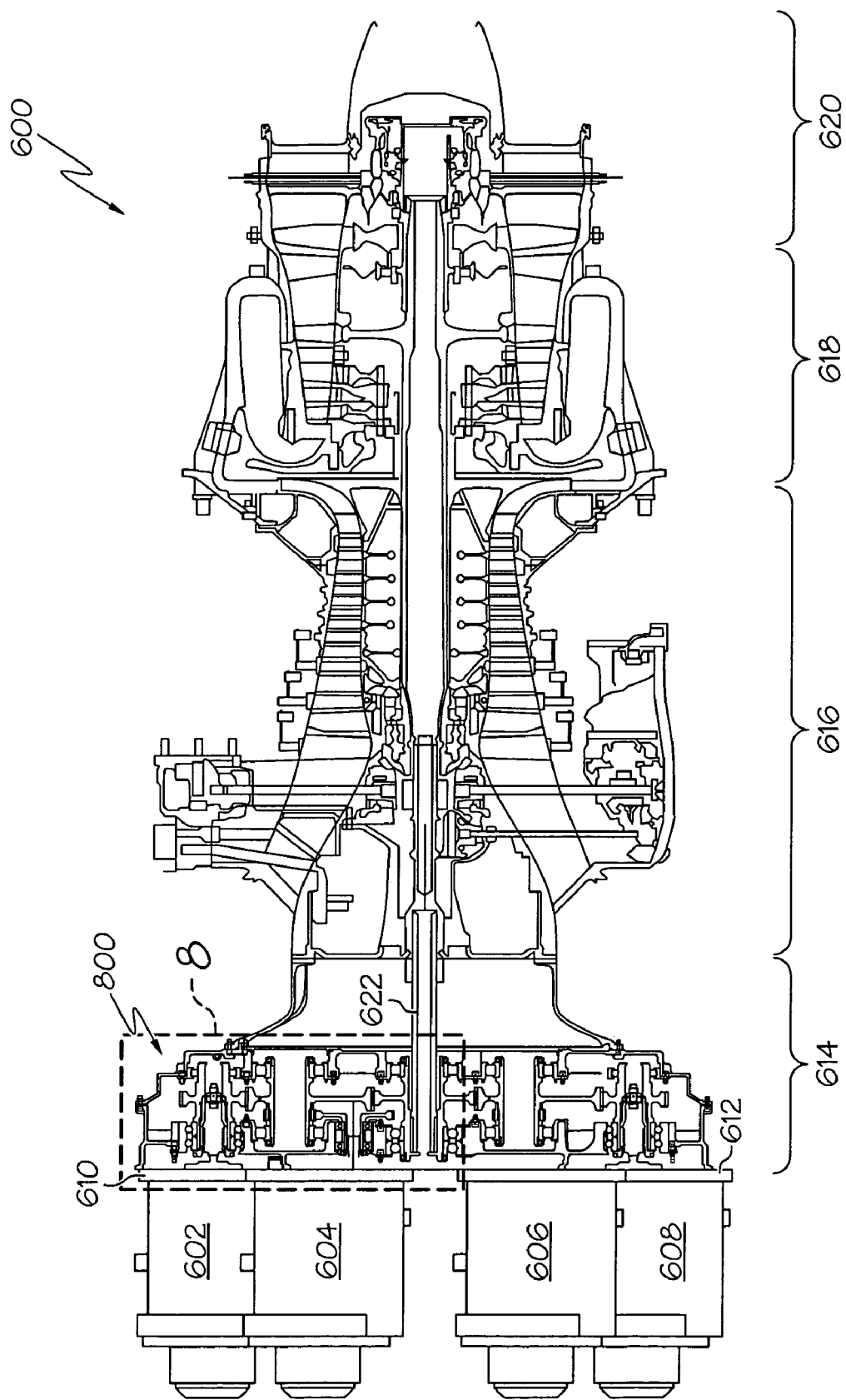
FIG. 6 is a cross section of a gas turbine engine, according to another embodiment.

FIG. 6 is a cross section of a gas turbine engine 600, according to another embodiment. Gas turbine engine 600 may be coupled a plurality of generators 602, 604, 606, 608. In an embodiment, a first pair of generators 602, 604 may be mounted to a gearbox 610, while a second pair of generators 606, 608 may be mounted to another gearbox 612. Although four generators 602, 604, 606, 608 are shown in FIG. 6, any other number of gearbox-mounted generators 602 may alternatively be included. In an embodiment, gas turbine engine 600 may have six generators, however more or fewer may alternatively be included.

Figure 7:
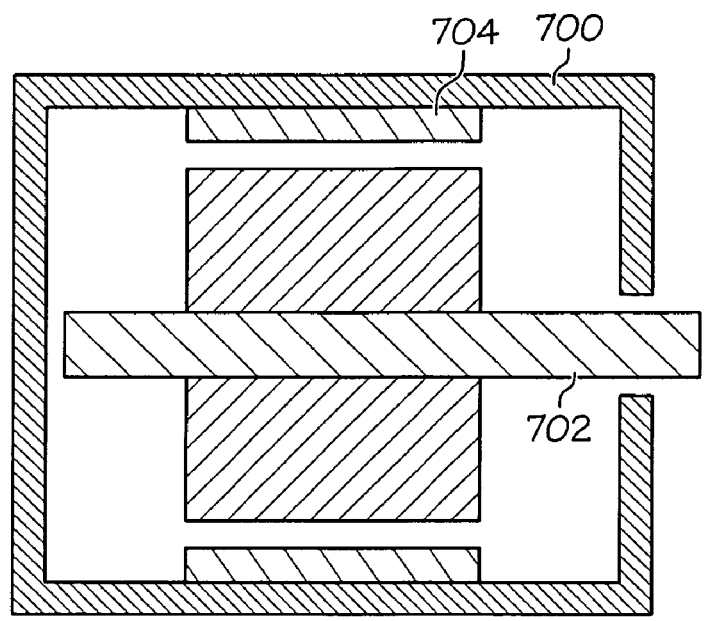
FIG. 7 is a simplified cross section of a generator, according to an embodiment.

FIG. 7 is a simplified cross section of a generator 700, according to an embodiment. Generator 700 may include at least a rotor 702 and a stator 704. Rotor 702 and stator 704 may have any suitable generator configuration in which rotor 702 rotates relative to stator 704 to thereby produce power. The power may be supplied to modules that may comprise gas turbine engine 600. With additional reference to FIG. 6, for example, gas turbine engine 600 may comprise a fan module 614, a compressor module 616, a combustor module 618, and a turbine module 620, and the power may be used to rotate a main shaft 622 to which modules 614, 616, 618, 620 are coupled. It will be appreciated that each of generators 602, 604, 606, 608 may also be configured similarly to generator 700 depicted in FIG. 7. In this regard, during assembly, rotors 702 of each of generators 602, 604, 606, 608 may be synchronized so that each may be initially positioned at a predetermined angular position and to rotate together to thereby increase generator efficiency. Additionally, each rotor 702 may be directly or indirectly coupled to main shaft 622. In an embodiment, each rotor 702 is coupled to a generator drive shaft 624, 626, 628, 630 that can be coupled to main shaft 622.

Figure 8:
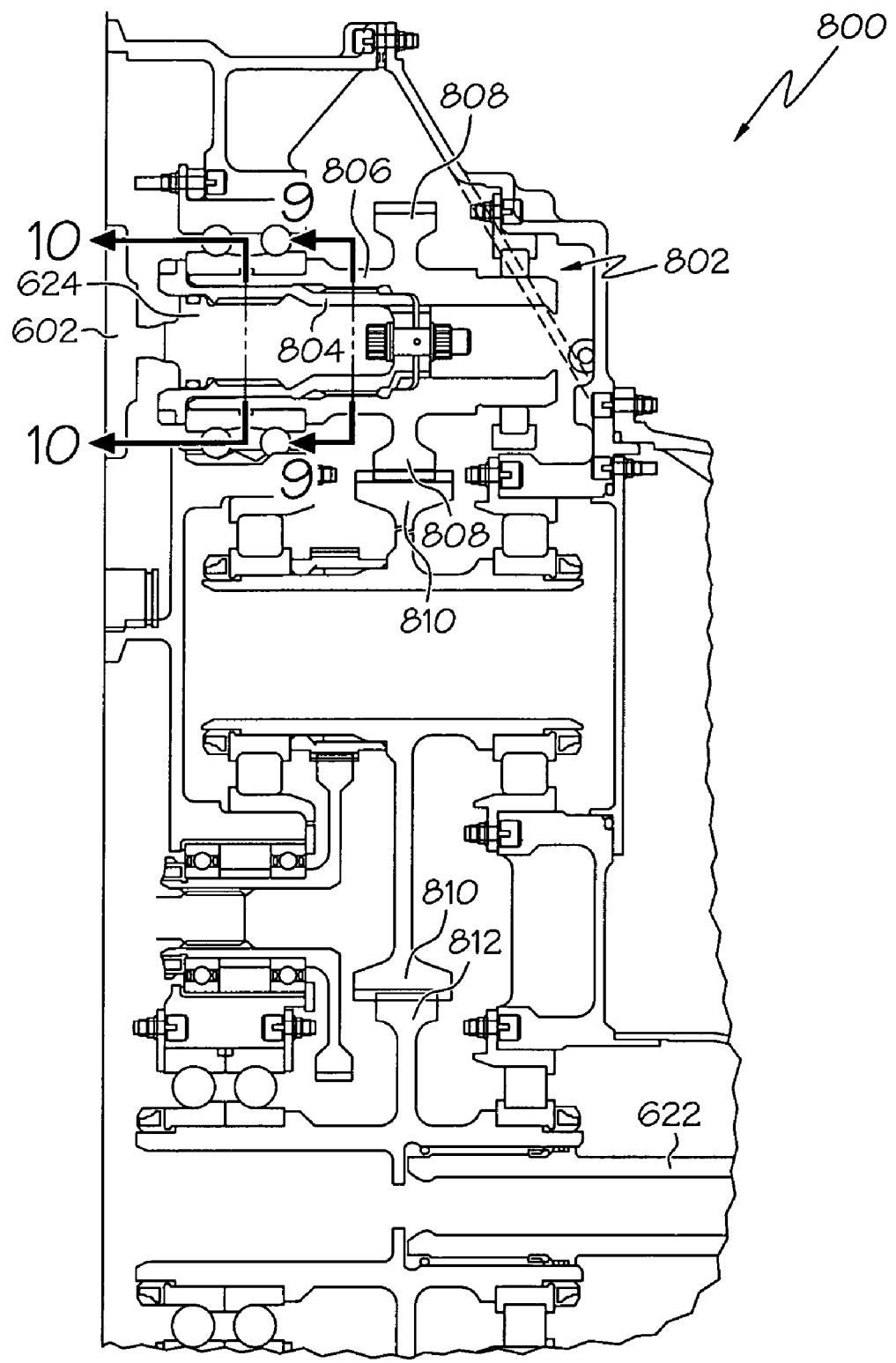
FIG. 8 is a close up view of a portion of an adjustable gear arrangement indicated by dotted line 8 in FIG. 6, according to an embodiment.

In an embodiment, main shaft 622 is coupled to generator drive shafts 624, 626, 628, 630 or each corresponding generator 602, 604, 606, 608 via a corresponding number of adjustable gear arrangements 800, only one of which is shown in FIG. 6. Adjustable gear arrangements 800 are configured to synchronize generators 602, 604, 606, 608 so that all of generators 602, 604, 606, 608 have substantially the same angular orientation. A close up view of a portion of adjustable gear arrangement 800 in FIG. 6 indicated by dotted line 8 is provided in FIG. 8.

Figure 9:
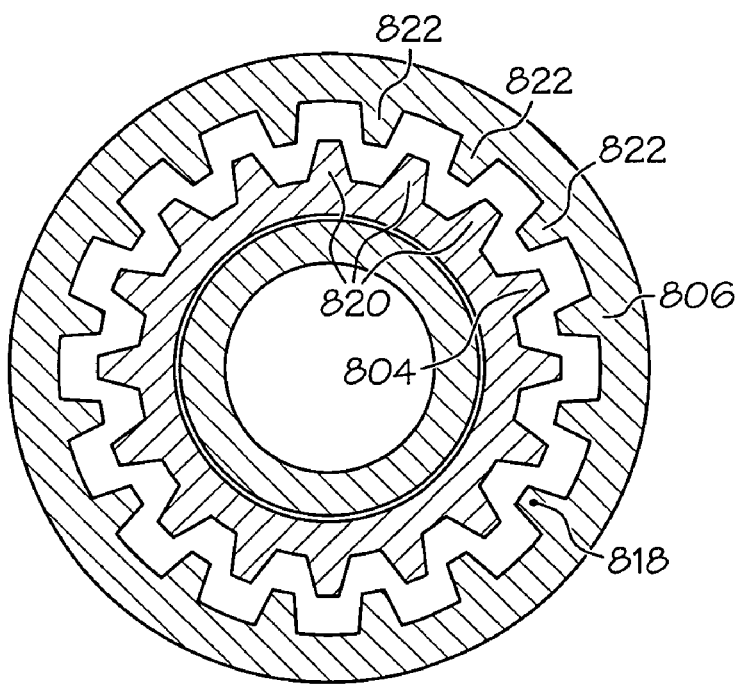
FIG. 9 is a cross-sectional view of inner and outer spline shafts is depicted in, according to an embodiment.

Adjustable gear arrangement 800 may comprise an engine shaft 802 for driving a corresponding generator (e.g., generator 602). Engine shaft 802 may be directly or indirectly coupled to a main shaft (e.g., main shaft 622) and is coupled to generator drive shaft 830. In an embodiment in which engine shaft 802 is indirectly coupled to the main shaft, engine shaft 802 may be a two-piece splined shaft. FIG. 9 is a cross-sectional view of engine shaft 802, according to an embodiment. For example, according to an embodiment, engine shaft 802 may include an inner spline shaft 804 and an outer spline shaft 806. Inner spline shaft 804 may have teeth extending radially outwardly from its outer surface, while outer spline shaft 806 may have teeth extending radially inwardly from its inner surface, which are configured to mesh with the teeth of inner spline shaft 804. As a result, inner and outer spline shafts 804, 806 may rotate together during engine operation. The number of teeth on the outer surface of inner spline shaft 804 and the number of teeth on the inner surface of outer spline shaft 806 are equal.

Adjustable gear arrangement 800 may also comprise a number of gears between engine shaft 802 and the main shaft. For example, a first gear 808 may be mounted to or extend from engine shaft 802. First gear 808 may engage a second gear 810 that engages a third gear 812, which is mounted to a portion of the main shaft. First gear 808, second gear 812, and third gear 812 may be any one of numerous suitable types of gears. In an embodiment, first gear 808 may be a generator drive gear, second gear 810 may be an idler gear, and third gear 812 may be an input gear. In another embodiment, one or more of gears 808, 810, 812 may be helical gears. It will be appreciated that each of gears 808, 810, 812 engage with each other via a plurality of teeth that extend radially outwardly from each gear 808, 810, 812. The plurality of teeth of each gear 808, 810, 812 may or may not be equal to a number of teeth on either inner or outer spline shaft 804, 806. As will be further described below, the number of teeth of one or more of gears 808, 810, 812 may be used in a method to synchronize generators (e.g., generators 602, 604, 606, 608).

Figure 10:
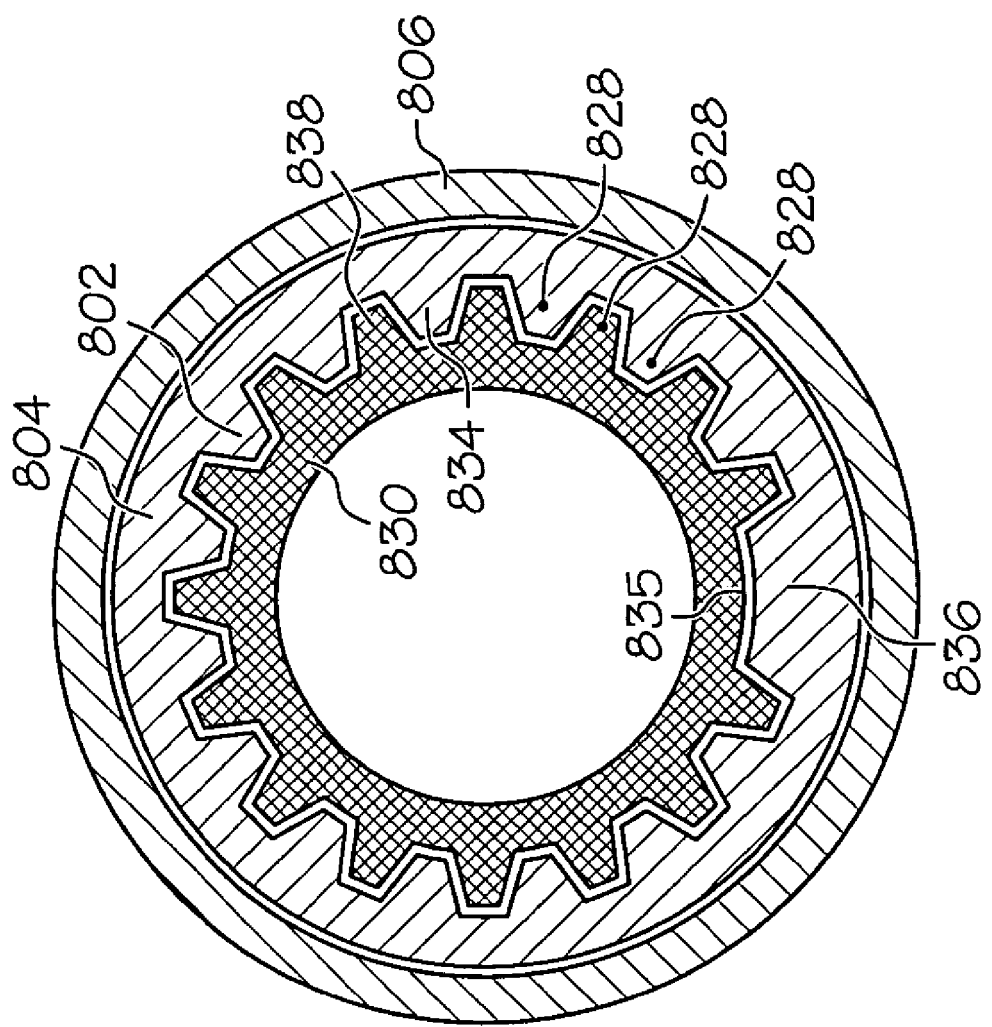
FIG. 10 is a cross-sectional view of inner and outer generator drive splines, according to an embodiment.

As mentioned briefly above, engine shaft 802 is also coupled to generator drive shaft 830. FIG. 10 is a close-up cross-sectional view of a portion of engine shaft 802 and generator drive shaft 830, according to an embodiment. Here, engine shaft 802 includes a number of teeth 834, and generator drive shaft 830 includes a number of teeth 838. Engine shaft teeth 834 may extend radially inwardly from an inner surface either from engine shaft 802 or from a gear (not shown) on engine shaft 802. Drive shaft teeth 838 may extend radially outwardly from the outer surface of generator drive shaft 830 (or from a non-illustrated gear on drive shaft 830) and may be configured to mesh with the engine shaft teeth 834. As a result, engine shaft 802 and generator drive shaft 830 may rotate together during engine operation. The number of teeth on the engine shaft 802 and the number of teeth on generator drive shaft 830 may or may not be equal. For example, one of engine shaft 802, or drive shaft 830 may include a pilot feature. In an embodiment, the pilot feature may be a notch (not shown) between two of teeth 834 or teeth 838. In another embodiment, pilot feature may be a mark 828 (shown in phantom) on either one of teeth 834 or teeth 838. In another embodiment, the pilot feature may be a missing spline tooth 835 on the inner shaft and a filled-in space 836 on the outer shaft.

Figure 11:
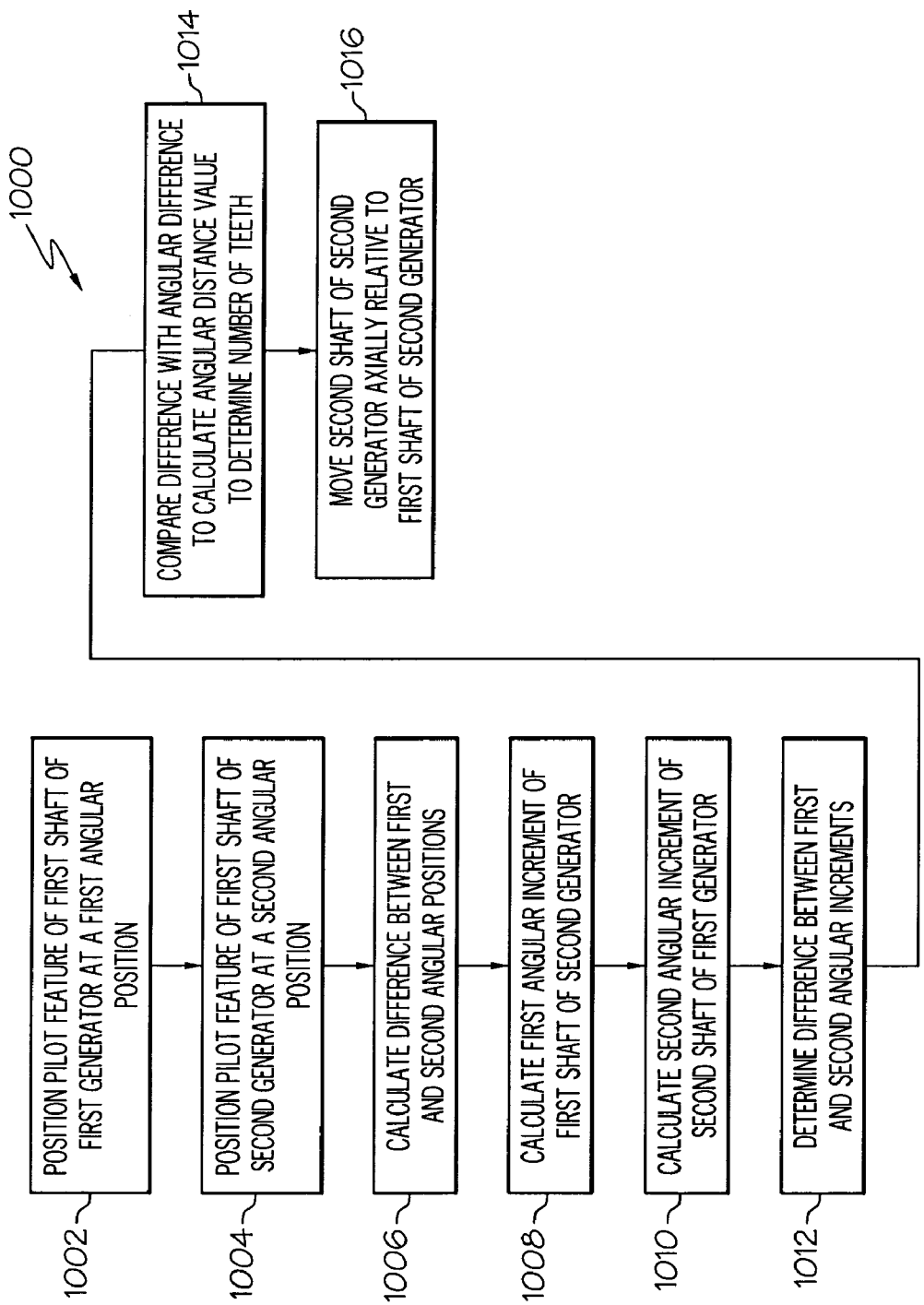
FIG. 11 is a flow diagram of a method for synchronization of a plurality of generators, according to an embodiment.

FIG. 11 illustrates a method 1000 for synchronization of a plurality of generators. In an embodiment, a pilot feature on a shaft of a first generator of the plurality of generators is positioned at a first angular position that is substantially aligned with a first predetermined reference point, step 1002. In an embodiment, the shaft may have radially extending teeth, such as external teeth. In another embodiment, the shaft may be made up of a gear that may have teeth. In any case, the shaft is configured to rotate in at least a first direction about an axis; however, to prevent the shaft from becoming repositioned, it may be locked in position. For example, in an embodiment, gears that are mounted to the shaft and gears that mesh with those gears may be used to lock the shaft into position. In an embodiment, the first predetermined reference point may be located at a position relative to the axis that is substantially equal to a predetermined angular position.

Next, a pilot feature of a first shaft of a second generator of the plurality of generators is positioned at a second angular position substantially in alignment with a second predetermined reference point, step 1004. In an embodiment, the first shaft of the second generator may have radially extending teeth, such as external teeth. In any case, the shaft may be configured to rotate about an axis. Additionally, in an embodiment, the second predetermined reference point may be located at a position relative to the axis that is substantially equal to the predetermined angular position.

Figure 12:
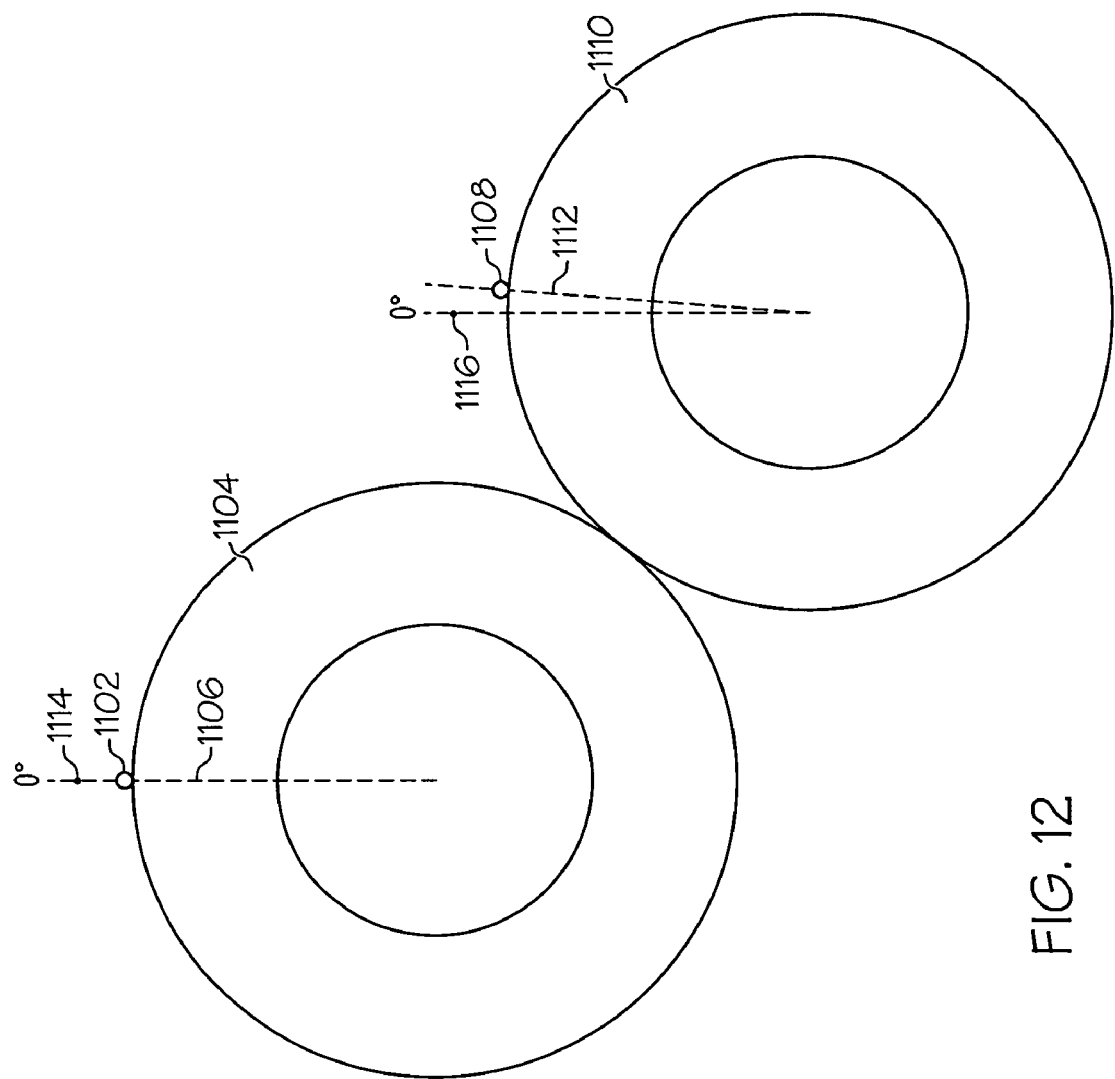
FIG. 12 is a cross-sectional simplified view of an engine during a step of the method of FIG. 11, according to an embodiment.

In an example, FIG. 12 shows a cross-sectional simplified view of a portion of an engine after step 1004 of method 1000. Here, a pilot feature, represented by dot 1102, of a first shaft 1104 of a first generator is shown at a first angular position 1106. A pilot feature, represented by dot 1108, of a first shaft 1110 of a second generator is aligned with a second angular position 1112. In this embodiment, the first angular position 1106 is aligned with a first predetermined reference point 1114, and the second angular position 1112 is substantially equal to, but may not exactly be aligned with, a second predetermined reference point 1116. Each of the first and the second predetermined reference points 1114, 1116 are substantially equal to a predetermined angular position. For example, here, the predetermined angular position is at 0 degrees, however, in other embodiment, it may be different.

Referring back to FIG. 11, in embodiments in which the pilot feature of the first shaft of the second generator may not be exactly aligned with the second predetermined reference point, an angular difference may be calculated between the first angular position and the second angular position, step 1006. In an embodiment, the angular difference is obtained by measuring an actual angular position of the second shaft using a fixture having an angular measuring feature and the actual angular position is subtracted from the value of the first angular position.

Next, a first angular increment of rotation of the first shaft of the second generator may be calculated, step 1008. The first angular increment represents an angular distance between a first tooth and an adjacent, second tooth extending radially from the first shaft or a degree of change if the first tooth was moved to the position of the adjacent, second tooth. In an embodiment, the calculation may be made by dividing 360° by a number of the plurality of teeth extending from the first shaft. In one embodiment, the first shaft of the second generator has 61 teeth, for example, first shaft may be a spline shaft where each of the inner and outer spline shafts has 61 teeth. In such case, if a first tooth is aligned at 0 degrees, the first angular increment indicates an angle between the first tooth and a second tooth adjacent the first tooth, which may be about 5.9 degrees (i.e., 360 degrees/61 teeth).

A second angular increment of rotation of the second shaft of the second generator is determined, step 1010. The second angular increment represents an angular distance between a first tooth and an adjacent, second tooth extending radially from the second shaft of the second generator or a degree of change if the first tooth was moved to the position of the adjacent, second tooth. For example, the second angular increment may be calculated by dividing 360° by the number of the plurality of gear teeth. In an embodiment, the teeth extend outwardly from a gear mounted to the second shaft. The gear may have 59 teeth; thus, rotating the gear would result in a change of 6.1 degrees (i.e., 360 degrees/59 teeth).

A difference is determined between the first angular increment and the second angular increment, step 1012. The difference represents a net rotation when the first shaft of the second generator is rotated one tooth in a first direction and the second shaft (or gear, in some embodiments) is rotated one tooth in a second direction opposite the first direction. Thus, in the above example in which the first shaft has 61 teeth and the gear has 59 teeth, the net rotation would be about 0.2 degrees.

The determined difference is compared with the angular difference to calculate an angular distance value, and the angular distance value is used to determine the number of teeth by which to move the second shaft of the second generator, step 1014. For example, the angular distance value may be obtained by dividing the angular difference by the determined difference. In an embodiment, the angular difference may be about 0.4 degrees and the determined difference may be about 0.2 degrees. For example, dividing the angular difference (e.g., 0.4 degrees) by the determined difference (e.g., 0.2 degrees) is equal to two. Thus, the first shaft and the second shaft (or gear, in some embodiments) may be rotated two gear teeth (0.4 degree/0.2 degree=2 teeth). It will be appreciated that a tolerance may be allowed to exist such that the pilot feature of the second shaft (or gear in some embodiments) may be located at an angular position that may not be equal to that of the pilot feature of the first shaft. For example, if an acceptable tolerance for the degree of alignment of the first and the second generators may exist, such as a tolerance of about ±0.1°, and the angular difference is about 0.5 degree, the first shaft and the gear still may be rotated only two teeth.

In an embodiment in which the gear of the second shaft of the second generator comprises a helical gear, the gear may be moved axially relative to the first shaft of the second generator, step 1016. For example, the axial positioning of the gear may be changed by adding a shim between the first and second shafts of the second generator. Adjusting the axial position of the gear, is a 'fine tune' adjustment of the synchronization.

The gear of the second shaft may be locked into position, step 120. In another embodiment, steps 104, 106, 108, and 110 may be performed on a shaft of a third generator to synchronize the shaft with those of the first and second generators.

It should be understood, of course, that the foregoing relates to exemplary embodiments of the inventive subject matter and that modifications may be made without departing from the spirit and scope of the inventive subject matter as set forth in the following claims.

We claim:

1. A method for synchronization of multiple generators in a gas turbine engine comprising the steps of:
    locking an input gear and an idler gear, wherein the input gear engages the idler gear;
    rotating a drive gear shaft, the drive gear shaft comprising a helical generator drive gear and a fine pitch spline, the drive gear shaft rotationally mounted on a thrust bearing assembly and coupled to a gear mounting flange via the thrust bearing assembly, wherein the generator drive gear is engaged by the idler gear;
    positioning the drive gear shaft to a desired degree of alignment with an intermediate shaft, wherein the intermediate shaft is connected to the drive gear shaft through the fine pitch spline;
    advancing the helical generator drive gear axially by varying a thickness of a shim to fine tune the degree of alignment, wherein the shim is disposed between, and engages, the thrust bearing assembly and the gear mounting flange;
    clamping the generator drive gear in position; and
    repeating all the steps above for each additional generator to be synchronized.

2. The method of claim 1 wherein the degree of alignment for each of the multiple generators differs by only from about ±0.1° to about ±1.0° from the degree of alignment of the other multiple generators.

3. The method of claim 1 wherein the generators are part of the gas turbine engine.

4. The method of claim 3 wherein the generators are synchronized during assembly of the gas turbine engine.

5. The method of claim 1 wherein at least two generators are synchronized.

6. The method of claim 1 wherein six generators are synchronized.

7. A method of synchronizing a plurality of generators coupled to a main shaft of a gas turbine engine, the method comprising the steps of:
    positioning a pilot feature of a shaft of a first generator of the plurality of generators, the pilot feature positioned at a first angular position that is substantially aligned with a first predetermined reference point, the shaft of the first generator configured to rotate in a first direction about an axis and the first predetermined reference point located at a predetermined angular position relative to the axis;

locking the shaft of the first generator at the first angular position;

aligning a pilot feature of a first shaft of a second generator of the plurality of generators with a second angular position that is substantially aligned with a second predetermined reference point, the first shaft of the second generator configured to rotate in the first direction about an axis, the second predetermined reference point located at a position relative to the axis that is substantially equal to the predetermined angular position;

calculating an angular difference between the first angular position and the second angular position, when the pilot feature of the first shaft of the second generator is not in exact alignment with the second predetermined reference point; and rotating a second shaft splined with the first shaft of the second generator of the plurality of generators about the axis in a second direction opposite of the first direction, based on the calculated angular difference.

8. The method of claim 7, wherein the step of rotating further comprises rotating a gear mounted to the second shaft about the axis in a second direction opposite of the first direction, based on the calculated angular difference.

9. The method of claim 8, wherein the gear mounted to the second shaft of the second generator comprises a helical gear and the method further comprises moving the gear axially relative to the first shaft of the second generator.

10. The method of claim 9, wherein the step of moving the gear axially comprises adding a shim between the first shaft of the second generator and the second shaft of the second generator.

11. The method of claim 8, wherein the first shaft of the second generator has a plurality of teeth extending radially therefrom, and the second shaft of the second generator has a plurality of teeth extending radially therefrom, and the method further comprises:

determining a first angular increment of rotation of the first shaft of the second generator, wherein the first angular increment represents a degree of change when a first tooth of the plurality of teeth extending radially from the first shaft was moved to a position of an adjacent, second tooth of the plurality of teeth extending radially from the first shaft;

determining a second angular increment of rotation of the second shaft of the second generator of the plurality of generators, wherein the second angular increment represents a degree of change when a first tooth of the plurality of teeth extending radially from the second shaft was moved to a position of an adjacent, second tooth of the plurality of teeth extending radially from the second shaft;

determining a difference between the first angular increment and the second angular increment;

comparing the determined difference with the angular difference to calculate an angular distance value; and using the angular distance value to determine a number of teeth by which to move the second shaft of the second generator.

12. The method of claim 11, wherein the plurality of teeth extending radially from the second shaft extend from a gear mounted to the second shaft and the step of rotating further comprises rotating the gear about the axis in the second direction opposite of the first direction, based in part, on the determined number of teeth.

13. The method of claim 7, further comprising the step of repeating the steps of aligning, calculating, and rotating for a shaft of a third generator of the plurality of generators.

14. The method of claim 7, wherein the step of positioning comprises dividing 360° by a number of teeth extending radially from the first shaft of the first generator and the step of aligning comprises dividing 360° by a number of teeth extending radially from the first shaft the second generator.

15. The method of claim 7, further comprising the step of locking the first and the second shafts of the second generator into position after the step of rotating.

16. A method of synchronizing a plurality of generators coupled to a main shaft of a gas turbine engine, the method comprising the steps of:

positioning a pilot feature of a shaft of a first generator of the plurality of generators at a first angular position that is substantially aligned with a first predetermined reference point, the shaft of the first generator configured to rotate in a first direction about an axis and the first predetermined reference point located at a predetermined angular position relative to the axis;

locking the shaft of the first generator at the first angular position;

aligning a pilot feature of a first shaft of a second generator of the plurality of generators with a second angular position that is substantially aligned with a second predetermined reference point, the first shaft of the second generator configured to rotate in the first direction about an axis, the second predetermined reference point located at a position relative to the axis that is substantially equal to the predetermined angular position;

calculating an angular difference between the first angular position and the second angular position, when the pilot feature of the first shaft of the second generator is not in exact alignment with the second predetermined reference point;

determining a first angular increment of rotation of the first shaft of the second generator, wherein the first angular increment represents a degree of change when a first tooth of the plurality of teeth extending radially from the first shaft was moved to a position of an adjacent second tooth of the plurality of teeth extending radially from the first shaft;

determining a second angular increment of rotation of a second shaft that is splined with the first shaft of the second generator, wherein the second angular increment represents a degree of change when a first tooth of the plurality of teeth extending radially from the second shaft was moved to a position of an adjacent second tooth of the plurality of teeth extending radially from the second shaft;

determining a difference between the first angular increment and the second angular increment;

comparing the determined difference with the angular difference to calculate an angular distance value;

using the angular distance value to determine a number of teeth by which to move the second shaft of the second generator; and rotating the second shaft about the axis in a second direction opposite of the first direction, based in part, on the calculated angular difference.

17. The method of claim 16, wherein the plurality of teeth extending radially from the second shaft extend from a gear mounted to the second shaft and the step of rotating further comprises rotating the gear about the axis in a second direction opposite of the first direction, based in part, on the determined number of teeth.

18. The method of claim 16, further comprising the step of repeating the steps of aligning, calculating, and rotating for a shaft of a third generator of the plurality of generators.

19. The method of claim 16, wherein the gear mounted to the second shaft of the second generator comprises a helical gear and the method further comprises moving the gear axially relative to the first shaft of the second generator.

* * * * *